US009923244B2

United States Patent
Takanashi et al.

(10) Patent No.: US 9,923,244 B2
(45) Date of Patent: Mar. 20, 2018

(54) NONAQUEOUS ELECTROLYTE SECONDARY BATTERY

(71) Applicant: SANYO Electric Co., Ltd., Daito-shi, Osaka (JP)

(72) Inventors: Yuu Takanashi, Hyogo (JP); Atsushi Fukui, Hyogo (JP); Kazuhiro Hasegawa, Hyogo (JP); Sho Tsuruta, Hyogo (JP)

(73) Assignee: SANYO ELECTRIC CO., LTD., Daito-shi (JP)

( * ) Notice: Subject to any disclaimer, the term of this patent is extended or adjusted under 35 U.S.C. 154(b) by 35 days.

(21) Appl. No.: 15/124,541

(22) PCT Filed: Mar. 2, 2015

(86) PCT No.: PCT/JP2015/001075
§ 371 (c)(1),
(2) Date: Sep. 8, 2016

(87) PCT Pub. No.: WO2015/136881
PCT Pub. Date: Sep. 17, 2015

(65) Prior Publication Data
US 2017/0018808 A1      Jan. 19, 2017

(30) Foreign Application Priority Data
Mar. 11, 2014  (JP) ................................ 2014-047174

(51) Int. Cl.
*H01M 10/0569*      (2010.01)
*H01M 4/525*      (2010.01)
(Continued)

(52) U.S. Cl.
CPC ....... *H01M 10/0569* (2013.01); *H01M 4/525* (2013.01); *H01M 10/0525* (2013.01);
(Continued)

(58) Field of Classification Search
CPC ............. H01M 10/0569; H01M 4/525; H01M 10/0525; H01M 10/4235
See application file for complete search history.

(56) References Cited

U.S. PATENT DOCUMENTS

| 2004/0142240 A1 | 7/2004 | Nagayama et al. |
| 2004/0191628 A1 | 9/2004 | Inoue et al. |

(Continued)

FOREIGN PATENT DOCUMENTS

| JP | 10-241691 A | 9/1998 |
| JP | 2000-123834 A | 4/2000 |

(Continued)

OTHER PUBLICATIONS

International Search Report dated Jun. 2, 2015, issued in counterpart International Application No. PCT/JP2015/001075 (2 pages).

*Primary Examiner* — Helen O Conley
(74) *Attorney, Agent, or Firm* — Westerman, Hattori, Daniels & Adrian, LLP

(57) ABSTRACT

Provided is a nonaqueous electrolyte secondary battery in which the structural change of a positive electrode active material is suppressed at high voltage and which can achieve high capacity and long life. The nonaqueous electrolyte secondary battery includes a positive electrode containing a positive electrode active material storing and releasing lithium ions, a negative electrode containing a negative electrode active material storing and releasing lithium ions, and a nonaqueous electrolyte. The positive electrode active material is a cobalt composite oxide which has a layered rock salt structure and which includes a lithium layer containing magnesium, magnesium is present in the lithium layer after charge is performed at a potential of 4.53 V or more versus lithium, and 4.5 mole percent to 10 mole percent of a magnesium-containing compound is present on (Continued)

the negative electrode with respect to magnesium in the positive electrode.

7 Claims, 11 Drawing Sheets

(51) Int. Cl.
    *H01M 10/0525*     (2010.01)
    *H01M 10/42*     (2006.01)

(52) U.S. Cl.
    CPC ............ *H01M 10/4235* (2013.01); *H01M 2300/0034* (2013.01); *H01M 2300/0037* (2013.01); *Y02T 10/7011* (2013.01)

(56) References Cited

U.S. PATENT DOCUMENTS

| | | |
|---|---|---|
| 2009/0011336 A1 | 1/2009 | Inoue et al. |
| 2011/0281165 A1 | 11/2011 | Ueda et al. |
| 2014/0242468 A1 | 8/2014 | Song et al. |

FOREIGN PATENT DOCUMENTS

| | | |
|---|---|---|
| JP | 2001-256975 A | 9/2001 |
| JP | 2003-346797 A | 12/2003 |
| JP | 2004-220952 A | 8/2004 |
| JP | 2004-288579 A | 10/2004 |
| JP | 2006-173137 A | 6/2006 |
| JP | 2006-324235 A | 11/2006 |
| JP | 2014-170739 A | 9/2014 |
| WO | 2006/054604 A1 | 5/2006 |

NONAQUEOUS ELECTROLYTE SECONDARY BATTERY

TECHNICAL FIELD

The present invention relates to a nonaqueous electrolyte secondary battery.

BACKGROUND ART

Nonaqueous electrolyte secondary batteries typified by lithium ion batteries are widely used as driving power supplies for portable electronic devices such as mobile phones including smartphones, mobile computers, PDAs, and portable music players. Furthermore, the nonaqueous electrolyte secondary batteries have become widely used in driving power supplies for electric vehicles and hybrid electric vehicles and stationary storage battery systems for applications for suppressing output fluctuations in solar power generation, wind power generation, and the like and peak shift applications for grid power for the purpose of storing electricity during nighttime to use electricity during daytime.

However, power consumptions tend to further increase with the improvement of applied devices; hence, a further increase in capacity is strongly required.

Examples of a method for increasing the capacity of the nonaqueous electrolyte secondary batteries include a method for increasing the capacity of an active material, a method for increasing the filling amount of an active material per unit volume, and a method for increasing the charge voltage of a battery. However, in the case of increasing the charge voltage of a battery, the crystal structure of a positive electrode active material is likely to be deteriorated or the positive electrode active material and a nonaqueous electrolyte solution are likely to react with each other.

As a measure against high voltage, Patent Literature 1 reports that a lithium layer is stabilized and the crystal structure at high voltage is stabilized in such a manner that after a positive electrode active material, $LiCoO_2$, is charged at 4.2 V to 4.3 V versus lithium, lithium is partially substituted with magnesium in an electrochemical way.

CITATION LIST

Patent Literature

PTL 1: Japanese Published Unexamined Patent Application No. 2004-266579

SUMMARY OF INVENTION

Technical Problem

However, this method creates a state that magnesium substitution has been performed in a lithium layer in a lithium abstraction region at a potential of 4.3 V or less versus lithium. In the case where high-potential charge is performed at a higher potential, 4.33 V or more, in this state, magnesium in the lithium layer is entirely abstracted and there is a problem in that the crystal structure is destabilized and charge/discharge cycle is reduced.

Solution to Problem

A nonaqueous electrolyte secondary battery according to an aspect of the present invention includes a positive electrode containing a positive electrode active material storing and releasing lithium ions, a negative electrode containing a negative electrode active material storing and releasing lithium ions, and a nonaqueous electrolyte. The positive electrode active material is a cobalt composite oxide which has a layered rock salt structure and which includes a lithium layer containing magnesium, magnesium is present in the lithium layer after charge is performed at a potential of 4.53 V or more versus lithium, and 4.5 mole percent to 10 mole percent of a magnesium-containing compound is present on the negative electrode with respect to magnesium in the positive electrode.

(Positive Electrode Active Material)

In the present invention, the positive electrode active material is represented by the formula $Li_{1-a}Mg_aCo_{1-b}M_bO_2$ where $0<a\leq0.05$, $0\leq b\leq0.1$, and M is at least one selected from Al, Mg, Mn, Ni, Fe, Ti, Zn, Mo, V, Sr, Sn, Sb, W, Ta, Nb, Ge, Zr, and Ba).

In a method for producing the cobalt composite oxide, which includes the lithium layer containing magnesium, it is preferable that a magnesium source is added to the cobalt composite oxide and firing is performed in such a state that the composition ratio of lithium to cobalt for a portion of lithium in the lithium-cobalt composite oxide is less than 1. This method allows magnesium to be uniformly present in the lithium layer. Therefore, even in the case where lithium is abstracted at a high potential of 4.33 V or more versus lithium, magnesium is stably present in the lithium layer; hence, the crystal structure of the lithium layer con be stabilized and the phase transition from an O3 structure in which the crystal structure is significantly disrupted to an H1-3 structure can be suppressed. Furthermore, cobalt is preferably partially substituted with nickel, manganese, and aluminium together. Substituting nickel enables high capacity to be achieved. Furthermore, substituting manganese and aluminium, which form a strong bond with oxygen, enables the crystal structure of a transition metal layer to be stabilized even in the case where a large amount of lithium is abstracted and charge is performed at a potential of 4.33 V or more versus lithium.

In the above formula, a preferably satisfies $0<a\leq0.05$. When $a<0.05$, the charge/discharge capacity decreases due to the relative reduction in amount of lithium. Furthermore, magnesium is partially substituted with a transition metal layer. This destabilizes the crystal structure of the transition metal layer. Therefore, charge/discharge cycle may possibly be reduced. Furthermore b preferably satisfies $0\leq b\leq0.1$. When $b>0.1$, substituting nickel, manganese, and aluminium together enables charge/discharge cycle to be enhanced.

In the lithium-cobalt composite oxide, magnesium present in the lithium layer is partially deposited on the negative electrode active material in charge/discharge cycles in the form of a magnesium-containing compound. In this stage, magnesium is preferably deposited on the negative electrode active material within the range of 4.5 mole percent to 10 mole percent with respect to the amount of magnesium in the positive electrode active material. This is because magnesium is present in the form of a protective film for the negative electrode and therefore the deterioration of the negative electrode in charge/discharge cycles can probably be suppressed.

A rare-earth compound or an oxide is preferably attached to a portion of the surface of the positive electrode active material. Attaching fine particles of the rare-earth compound or the oxide to the surface of the positive electrode active material in a dispersed state enables the structural change of the positive electrode active material to be suppressed when a charge-discharge reaction is carried out at high potential. The reason for this is unclear and is probably that attaching the rare-earth compound or the oxide to the surface thereof increases the reaction overvoltage during charge and enables the change in crystal structure due to phase transition to be reduced. The rare-earth compound preferably includes at least one selected from the group consisting of erbium hydroxide and erbium oxyhydroxide. The oxide preferably includes at least one selected from the group consisting of aluminium oxide, zirconium oxide, magnesium oxide, copper oxide, boron oxide, and lanthanum oxide.

(Negative Electrode Active Material

In the present invention, the negative electrode active material used is preferably one capable of storing and releasing lithium. For example, metallic lithium, lithium alloys, carbon compounds, metal compounds, and the like can be cited. These negative electrode active materials may be used alone or in combination. Examples of the carbon compounds include carbon materials with a turbostratic structure and carbon materials such as natural graphite, synthetic graphite, and glassy carbon. These have a very little change in crystal structure due to charge or discharge, are capable of obtaining high charge/discharge capacity and good cycle characteristics, and therefore are preferable. In particular, graphite has high capacity, is capable of obtaining high energy density, and therefore is preferable. Metallic lithium and the lithium alloys are cited. The alloys have higher potential as compared to graphite and therefore the potential of a positive electrode is high when a battery is charged or discharged at the same voltage; hence, higher capacity can be expected. Examples of a metal in the alloys include tin, lead, magnesium, aluminium, boron, gallium, silicon, indium, zirconium, germanium, bismuth, and cadnium. In particular, at least one of silicon and tin is preferably contained. Silicon and tin have a large capacity to store and release lithium and are capable of obtaining high energy density.

Examples of a constituent element, other than tin, in a tin alloy include lead, magnesium, aluminium, boron, gallium, silicon, indium, zirconium, germanium, bismuth, and cadnium. An example of a constituent element, other than silicon, in a silicon alloy is at least one of tin, lead, magnesium, aluminium, boron, gallium, indium, zirconium, germanium, bismuth, and cadnium.

(Nonaqueous Electrolyte Solvent)

A solvent for the nonaqueous electrolyte, which is used in the present invention, is not limited to a specific one and may be one conventionally used in nonaqueous electrolyte secondary batteries. For example, cyclic carbonates, linear carbonates, asters, cyclic ethers, linear ethers, nitriles, amides, and the like are cited. Examples of the cyclic carbonates include ethylene carbonate, propylene carbonate, and butylene carbonate. Examples of the linear carbonates include dimethyl carbonate, ethyl methyl carbonate, diethyl carbonate, methyl propyl carbonate, ethyl propyl carbonate, and methyl isopropyl carbonate. Examples of the esters include methyl acetate, ethyl acetate, propyl acetate, methyl propionate, ethyl propionate, and γ-butyrolactone. Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ethers. Examples of the linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl. Examples of the nitriles include acetonitrile. Examples of the amides include dimethylformamide. In particular, those obtained by partially or entirely substituting hydrogen in these compounds with fluorine are preferable, Fluorination Increases the oxidation resistance of the nonaqueous electrolyte and therefore the degradation of the nonaqueous electrolyte can be prevented even in a high-voltage state in which an oxidizing atmosphere on a surface of the positive electrode is high.

These compounds may be used alone or in combination. In particular, a solvent which is a combination of a cyclic carbonate and a linear carbonate is preferable.

(Electrolyte Salt)

A lithium salt added to the nonaqueous electrolyte may be one generally used in conventional nonaqueous electrolyte secondary batteries as an electrolyte. Examples of the lithium salt include $LiPF_6$, $LiBF_4$, $LiAsF_6$, $LiClO_4$, $LiCF_3SO_3$, $LiN(FSO_2)_2$, $LiN(ClF_{2l+1}SO_2)$ $(CmF_{2m+L}SO_2)$ (where l and m are integers greater than or equal to 1), $LiC(CpF_{2p+1}SO_2)$ $(CqF_{2q+1}SO_2)$ $(CrF_{2r+1}SO_2)$ (where p, q, and r are integers greater than or equal to 1), $Li[B(C_2O_4)_2)]$ (lithium bis(oxalate) borate (LiBOB)), $Li[(B(C_2O_4)F_2]$, $Li[P(C_2O_4)F_4]$, and $Li[P(C_2O_4)_2F_2]$. These lithium salts may be used alone or in combination.

Advantageous Effects of Invention

In accordance with a nonaqueous electrolyte secondary battery according to an aspect of the present invention, the following battery can be obtained: a long-life nonaqueous electrolyte secondary battery in which the structural change of a positive electrode active material and a reaction with an electrolyte solution on the surface of an active material can be suppressed and the degradation of a negative electrode can also be suppressed even at a very high charge voltage of 4.53 V or more versus lithium and room temperature (25° C.) or high temperature (45° C.).

In the positive electrode active material, magnesium is allowed to be uniformly present in a lithium layer in such a manner that a magnesium source is added and firing is performed in such a state that the composition ratio of lithium to cobalt is less than 1. Therefore, it is conceivable that even in the case where lithium is abstracted at a high potential of 4.53 V or more versus lithium, magnesium is stably present in the positive electrode active material and the crystal structure can be stabilized.

Furthermore, it is conceivable that charge/discharge cycle characteristics at a high potential of 4.53 V or more versus lithium can be improved in such a manner that magnesium in a lithium layer in a positive electrode active material, $LiCoO_2$, is deposited on a negative electrode in charge/discharge cycles so as to form a protective film for the negative electrode to stabilize the negative electrode.

DESCRIPTION OF EMBODIMENTS

Embodiments of the present invention are described below in detail. The embodiments below are exemplified for the purpose of embodying the technical spirit of the present invention. It is not intended to limit the present invention to the embodiments. The present invention is equally applicable to various modifications made without departing from the technical spirit described in the claims. First of all, a detailed method for preparing a positive electrode is described.

Experiment Example 1

[Preparation of Positive Electrode Plate]

A positive electrode active material was prepared as described below. Lithium carbonate was used as a lithium source. Cobalt tetroxide was used as a cobalt source. Magnesium oxide was used as a magnesium source serving as a lithium-substituting element. After lithium carbonate, cobalt tetroxide, and magnesium oxide wore dry-mixed such that the molar ratio of lithium to magnesium was 99:1 and the molar ratio of a combination of lithium and magnesium to cobalt was 1:1, powder was formed into a pellet. The pellet was fired at 900° C. for 24 hours in an air atmosphere, whereby the positive electrode active material was prepared.

Next, a rare-earth compound was attached to the surface by a wet method as described below. With 3 liters of pure water, 1,000 g of the positive electrode active material was mixed, followed by stirring, whereby a suspension containing the positive electrode active material dispersed therein was prepared. A solution containing 1.85 g of erbium nitrate tetrahydrate serving as a rare-earth compound source was added to the suspension in such a manner that an aqueous solution of sodium hydroxide was added to the suspension such that the pH of the suspension was maintained at 9.

Incidentally, when the pH of the suspension is less than 9, erbium hydroxide and erbium oxyhydroxide are unlikely to be deposited. When the pH of the suspension is greater than 9, the deposition rate of these compounds is high and the dispersion of these compounds on the surface of the positive electrode active material is uneven.

Next, the suspension was suction-filtered, followed by water washing, whereby powder was obtained. The powder was dried at 120° C. and was then heat-treated at 300° C. for 5 hours, whereby a positive electrode active material powder in which erbium hydroxide was uniformly attached to the surface of the positive electrode active material was obtained.

Figure 1:
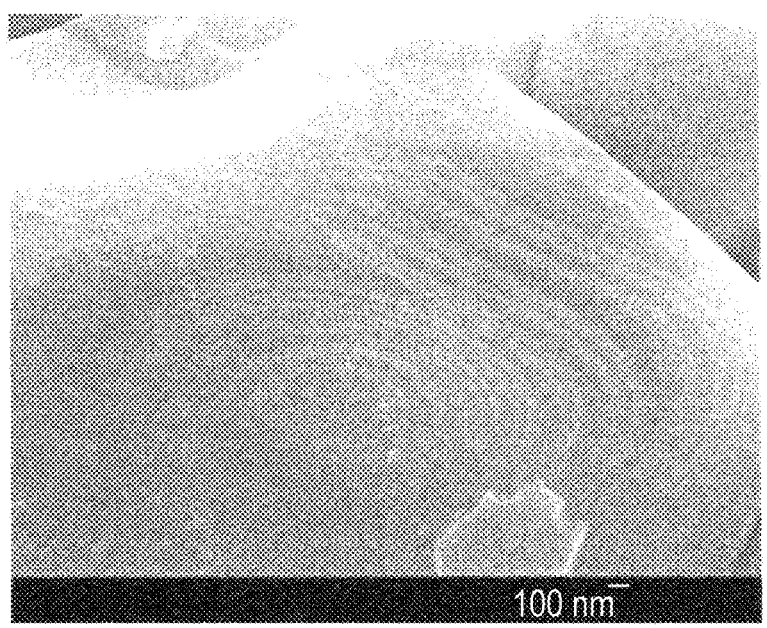
FIG. 1 is a SEM image of a positive electrode active material having a rare-earth compound attached to the surface thereof.

FIG. 1 shows a SEM image of the positive electrode active material having a rare-earth compound attached to the surface thereof. It was confirmed that an erbium compound was attached to the surface of the positive electrode active material in such a state that the erbium compound was evenly dispersed. The erbium compound had an average particle size of 100 nm or less. The amount of the attached erbium compound was 0.07 parts by mass with respect to the positive electrode active material in terms of erbium as measured by inductively coupled high-frequency plasma emission spectrometry (hereinafter referred to as ICP).

The following materials were mixed together: 96.5 parts by mass of the positive electrode active material, prepared as described above, having the rare-earth compound attached to the surface thereof; 1.5 parts by mass acetylene black serving as a conductive agent; and 2.0 parts by mass of a polyvinylidene fluoride powder serving as a binding agent. The mixture was mixed with an N-methylpyrrolidone solution, whereby positive electrode mix slurry was prepared. Next, the positive electrode mix slurry was applied to both surfaces of 15 μm thick aluminium foil serving as a positive electrode current collector by a doctor blade process, whereby a positive electrode active material mix layer was formed on each of both surfaces of the positive electrode current collector. After being dried, the positive electrode active material mix layers were rolled using compaction rollers and were cut to a predetermined size, whereby a positive electrode plate was prepared. An aluminium tab serving as a positive electrode current-collecting tab was attached to a portion of the positive electrode plate that was not covered by the positive electrode active material mix layers, whereby a positive electrode was prepared. The amount of the positive electrode active material mix layers was 39 mg/cm². The positive electrode mix layers had a thickness of 120 μm.

[Preparation of Negative Electrode Plate]

Graphite, carboxymethylcellulose serving as a thickening agent, and styrene-butadiene rubber serving as a binding agent were weighed at a mass ratio of 98:1:1 and were dispersed in water, whereby negative electrode mix slurry was prepared. The negative electrode mix slurry was applied to both surfaces of a negative electrode core, made of copper, having a thickness of 8 μm by a doctor blade process, followed by removing moisture by drying at 110° C., whereby negative electrode active material layers were formed. The negative electrode active material layers were rolled using compaction rollers and were cut to a predetermined size, whereby a negative electrode plate was prepared.

[Preparation of Nonaqueous Electrolyte Solution]

Fluoroethylene carbonate (FEC) and fluorinated propione carbonate (FMP) were prepared as nonaqueous solvents. FEC and FMP were mixed at a volume ratio of 20:60 at 25° C. Lithium hexafluorophosphate was dissolved in this nonaqueous solvent such that the concentration of lithium hexafluorophosphate was 1 mol/L, whereby a nonaqueous electrolyte was prepared.

[Preparation of Laminate-Type Nonaqueous Electrolyte Secondary Battery]

Figure 3:
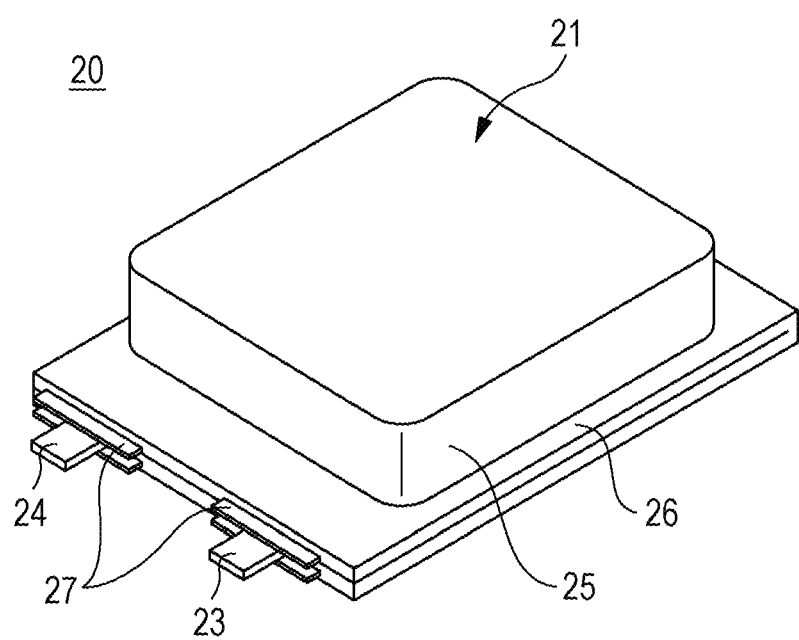
FIG. 3 is a perspective view of a laminate-typo nonaqueous electrolyte secondary battery.
Figure 4:
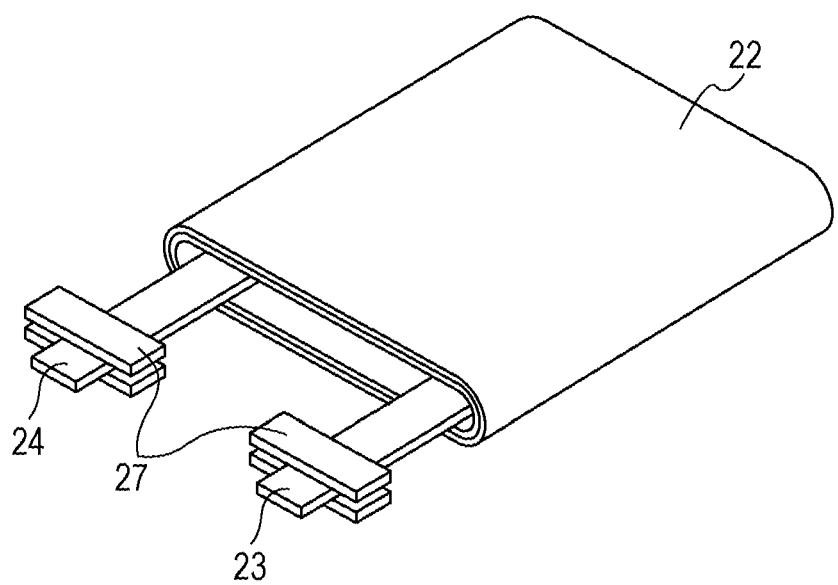
FIG. 4 is a perspective view of a wound electrode assembly shown in FIG. 3.

As shown in FIGS. 3 and 4, a laminate-type nonaqueous electrolyte secondary battery 20 includes a laminate enclosure 21; a wound electrode assembly 22, flatly formed, including a positive electrode plate and a negative electrode plate; a positive electrode current-collecting tab 23 connected to the positive electrode plate; and a negative electrode current-collecting tab 24 connected to the negative electrode plate. The wound electrode assembly 22 includes the positive electrode plate, the negative electrode plate, and a separator, the positive electrode plate, the negative electrode plate, and the separator being strip-shaped. The positive electrode plate and the negative electrode plate are wound with the separator therebetween in such a state that the positive electrode plate and the negative electrode plate are insulated from each other with the separator.

The laminate enclosure 21 includes a recessed portion 25. One end side of the laminate enclosure 21 is bent so as to cover an opening of the recessed portion 25. An end portion 26 located around the recessed portion 23 is welded to a bent portion facing the end portion 26, whereby an inner portion of the laminate enclosure 21 is sealed. The wound electrode assembly 22 and a nonaqueous electrolyte solution are housed in the sealed inner portion of the laminate enclosure 21.

The positive electrode current-collecting tab 23 and the negative electrode current-collecting tab 24 are arranged to protrude from the laminate enclosure 21. The laminate enclosure 21 is sealed with a resin member 27. Electricity is supplied to the outside through the positive electrode current-collecting tab 23 and the negative electrode current-collecting tab 24. The resin member 27 is placed between the laminate enclosure 21 and each of the positive electrode current-collecting tab 23 and the negative electrode current-collecting tab 24 for the purpose of increasing the adhesion and the purpose of preventing a short circuit through an aluminium alloy layer in a laminate member.

The laminate-type nonaqueous electrolyte secondary battery was prepared as described below. That is, the positive and negative electrode plates prepared as described above were wound with a separator therebetween, the separator being composed of a microporous membrane made of polyethylene, followed by attaching a polypropylene tape to the outermost periphery, whereby a cylindrical wound electrode assembly was prepared. The cylindrical wound electrode assembly was pressed, whereby a flat wound electrode assembly was prepared. The following member was prepared: a sheet-shaped laminate member having a five-layer structure consisting of a polypropylene resin layer, an adhesive agent layer, an aluminium alloy layer, an adhesive material layer, and a polypropylene resin layer. The laminate member was bent, whereby a bottom portion and a cup-shaped electrode assembly storage space were formed.

Next, the flat wound electrode assembly and the nonaqueous electrolyte were provided in the cup-shaped electrode assembly storage space in a glove box under an argon atmosphere. Thereafter, the separator was impregnated with the nonaqueous electrolyte by evacuating the inside of a laminate enclosure and an opening of the laminate enclosure was then sealed. In this way, the laminate-type nonaqueous electrolyte secondary battery was prepared so as to have a height of 62 mm, a width of 35 mm, and a thickness of 3.6 mm (dimensions excluding a sealing portion). In the case where the nonaqueous electrolyte secondary battery was charged to 4.50 V and was then discharged to 2.50 V, the discharge capacity thereof was 900 mAh.

[Conditions for Charge/Discharge Cycles]

The laminate-type nonaqueous electrolyte secondary battery (hereinafter referred to as the pouch cell in some cases) was subjected to a charge-discharge test under conditions below.

The battery was charged at a constant current of 400 mA until the voltage of the battery reached 4.50 V. After the battery voltage reached each value, the battery was charged at a constant voltage until the current reached 40 mA. The battery was discharged at a constant current of 800 mA until the battery voltage reached 2.50 V, followed by measuring the amount of electricity flowing in this operation, whereby the first-cycle discharge capacity was determined. The potential of graphite used in a negative electrode is about 0.1 V versus lithium. Therefore, the potential of a positive electrode is about 4.53 V to 4.60 V versus lithium at a battery voltage of 4.50 V. Charge and discharge were repeated under the same conditions as the above, the 100th-cycle discharge capacity was measured, and the capacity retention was calculated using an equation below.

Measurement was performed at temperatures of 25° C. and 45° C. Capacity retention (%)=(100th-cycle discharge capacity/first-cycle discharge capacity)×100

[Preparation of Monopolar Cell]

Figure 2:
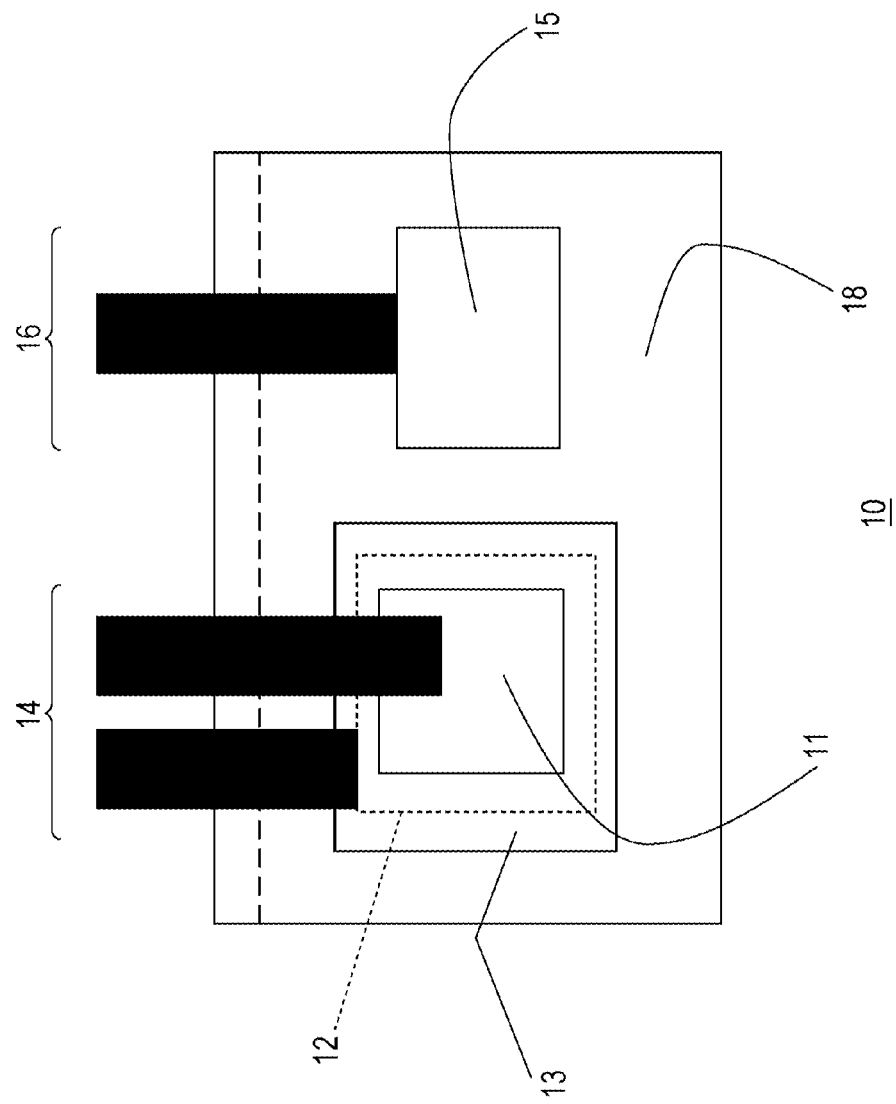
FIG. 2 is a schematic view of a monopolar cell.

A method for preparing a monopolar cell is described using FIG. 2. As shown in FIG. 2, the monopolar cell 10 includes a measurement electrode section 14 including a positive electrode 11, a negative electrode 12, and a separator 13 placed between the positive electrode 11 and the negative electrode 12 and also includes a reference electrode section 16 including a reference electrode 15 placed therein. The measurement electrode section 14 and the reference electrode section 16 are filled with a nonaqueous electrolyte solution 18. The negative electrode 12 and the reference electrode 15 are made of metallic lithium. The negative electrode 12 has a size capable of facing the positive electrode 11. The prepared monopolar cell 10 has a theoretical capacity of 100 mAh.

[Calculation of Amount of Magnesium Compound Deposited on Negative Electrode]

In order to calculate the amount of a magnesium compound deposited on the negative electrode, the monopolar cell was charged at a constant current of 0.15 lt (−15 mA) until the potential of the positive electrode reached 4.60 V. Thereafter, the battery was disassembled and the negative electrode was then analyzed by ICP, whereby the compound was determined. The percentage of the magnesium compound of the negative electrode was calculated by the following equation:

percentage of magnesium compound (%)=amount of magnesium in negative electrode/amount of magnesium in positive electrode active material×100.

Experiment Example 2

Nickel hydroxide and manganese dioxide were used as a nickel source and a manganese source, respectively, serving as cobalt-substituting element sources. Dry mixing was performed such that the molar ratio of lithium to magnesium was 99:1, the molar ratio of cobalt to nickel to manganese was 90:5:5, and the molar ratio of a combination of lithium and magnesium to a combination of cobalt, nickel, and manganese was 1:1, followed by forming powder into a pellet. The pellet was fired at 900° C. for 24 hours in an air atmosphere, whereby a positive electrode active material was prepared. A monopolar cell 10 and a laminate-type nonaqueous electrolyte secondary battery 20 wore prepared in substantially the same manner as that described in Experiment Example 1 except those described above.

Experiment Example 3

A monopolar cell 10 and a laminate-type nonaqueous electrolyte secondary battery 20 were prepared in substantially the same manner as that described in Experiment Example 2 except that a positive electrode active material was prepared such that the molar ratio of lithium to magnesium was 97:3.

Experiment Example 4

A monopolar cell 10 and a laminate-type nonaqueous electrolyte secondary battery 20 were prepared in substantially the same manner as that described in Experiment Example 1 except that a positive electrode active material was prepared such that magnesium was not substituted. Results of charge/discharge cycles and the amount of a magnesium compound on each negative electrode are shown in Table 1.

In 25° C. cycles, Experiment Example 4 exhibits a retention of 63% after 100 cycles and Experiment Examples 1 to 3 exhibit a high value of 86% or more. In 45° C. cycles. Experiment Example 4 exhibits 47%, which is significantly lower than room temperature, and Experiment Examples 1 to 3 exhibit a value of 62% or more, which exceeds that of Experiment Example 4. This is probably because the stable presence of magnesium in a lithium layer stabilized the crystal structure of the lithium layer and charge/discharge cycle characteristics could be improved.

Furthermore, in Experiment Examples 1 to 3, it is confirmed that 4.6% or more of a magnesium compound is deposited on a negative electrode with respect to magnesium in a positive electrode. It is conceivable that the magnesium compound deposited on the negative electrode formed a protective film for the negative electrode to suppress the reaction of the surface of the negative electrode with an electrolyte solution and therefore charge/discharge cycle characteristics could be improved.

TABLE 1

| | Amount of substituted Mg (a) (mole percent) | Amount of substituted M (b) (mole percent) | Amount of Mg in negative electrode (% vs. positive electrode active material) | Charge voltage (V vs. graphite) | Pouch cell | | | |
|---|---|---|---|---|---|---|---|---|
| | | | | | Temperature (° C.) | 100th-cycle capacity retention (%) | Temperature (° C.) | 100th-cycle capacity retention (%) |
| Experiment Example 1 | 1 | 0 | 7.6 | 4.5 | 25 | 93 | 45 | 79 |
| Experiment Example 2 | 1 | Ni = 5, Mn = 5 | 4.6 | 4.5 | 25 | 90 | 45 | 62 |
| Experiment Example 3 | 3 | Ni = 5, Mn = 5 | 5.1 | 4.5 | 25 | 88 | 45 | 73 |
| Experiment Example 4 | 0 | 0 | 0 | 4.5 | 25 | 65 | 45 | 47 |

Experiment Example 5

A monopolar cell 10 and a laminate-type nonaqueous electrolyte secondary battery 20 were prepared in substantially the same manner as that described in Experiment Example 1 except that a positive electrode active material was prepared such that the molar ratio of lithium to magnesium was 97:3.

Experiment Example 6

A monopolar cell 10 and a laminate-type nonaqueous electrolyte secondary battery 20 were prepared in substantially the same manner as that described in Experiment Example 1 except that a positive electrode active material was prepared such that the molar ratio of lithium to magnesium was 95:5.

Results of charge/discharge cycles are shown in Table 2. In 25° C. cycles, Experiment Example 4 exhibits a retention of 65% after 100 cycles and Experiment Examples 1, 5, and 6 exhibit a high value of 83% or more. In 45° C. cycles, Experiment Example 4 exhibits 47%, which is significantly lower than room temperature, and Experiment Examples 1, 5, and 6 exhibit a value of 50% or more, which exceeds that of Experiment Example 4. This is probably because the crystal structure of the lithium layer was stabilized even in the case of substituting a lot of magnesium and charge/discharge cycle characteristics could be improved.

TABLE 2

| | Pouch cell | | | | |
|---|---|---|---|---|---|
| | Amount of substituted Mg (a) (mole percent) | Charge voltage (V vs. graphite) | Temperature (° C.) | 100th-cycle capacity retention (%) | Temperature (° C.) | 100th-cycle capacity retention (%) |
| Experiment Example 1 | 1 | 4.5 | 25 | 93 | 45 | 79 |
| Experiment Example 4 | 0 | 4.5 | 25 | 65 | 45 | 47 |
| Experiment Example 5 | 3 | 4.5 | 25 | 83 | 45 | 51 |
| Experiment Example 6 | 5 | 4.5 | 25 | 88 | 45 | 50 |

Next, the prepared positive electrode active materials were measured by powder X-ray diffraction for the purpose of checking whether magnesium was present in a lithium layer.

[Powder X-Ray Diffraction Measurement]

Figure 5:
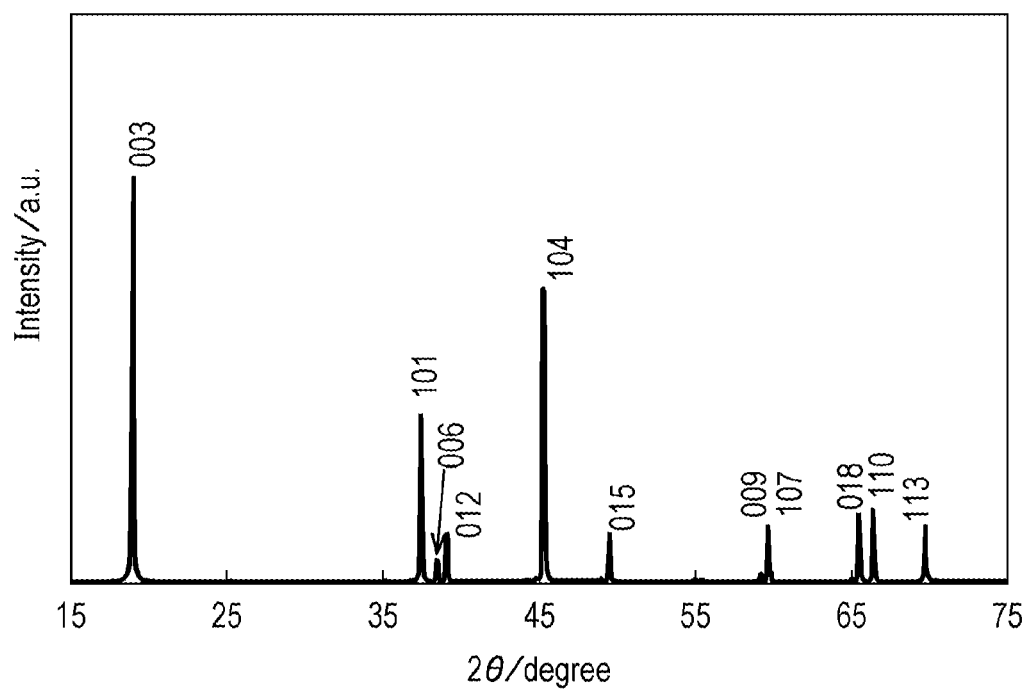
FIG. 5 is a powder X-ray diffraction pattern of $Li_{0.99}Mg_{0.01}CoO_2$.
Figure 6:
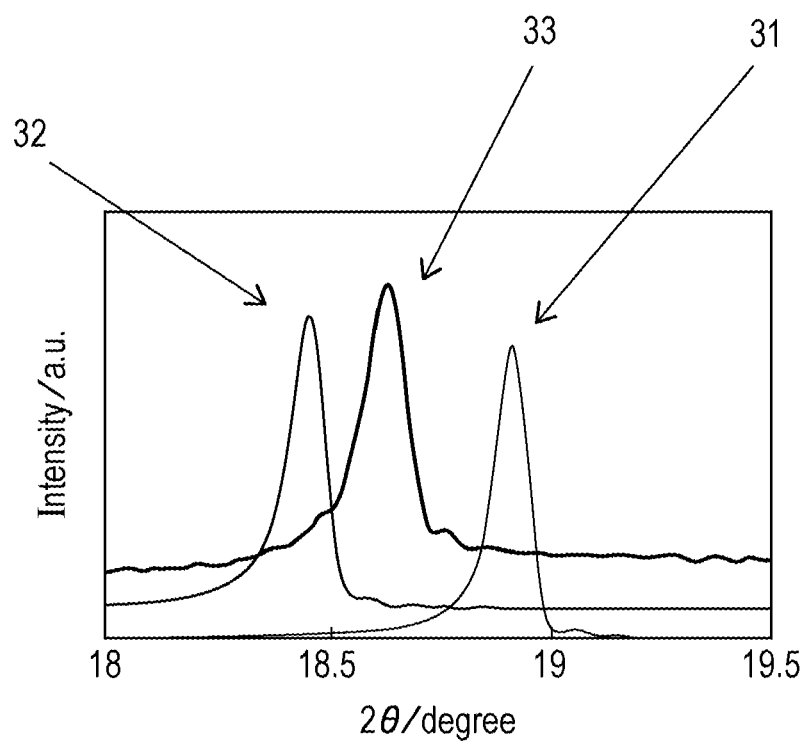
FIG. 6 is a powder X-ray diffraction pattern before and after high-voltage charge in Experiment Example 1.
Figure 7:
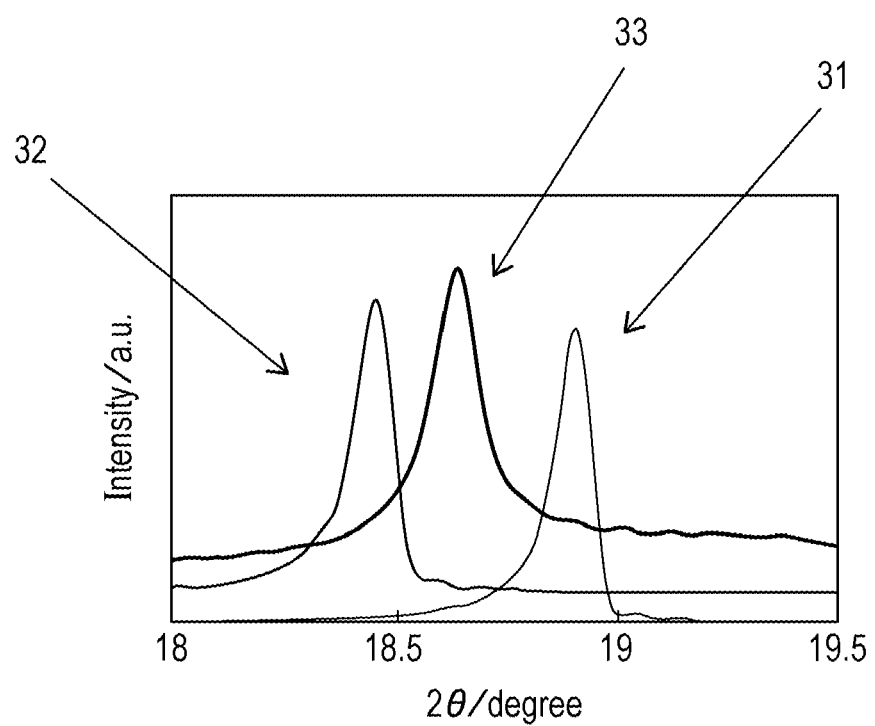
FIG. 7 is a powder X-ray diffraction pattern before and after high-voltage charge in Experiment Example 2.
Figure 8:
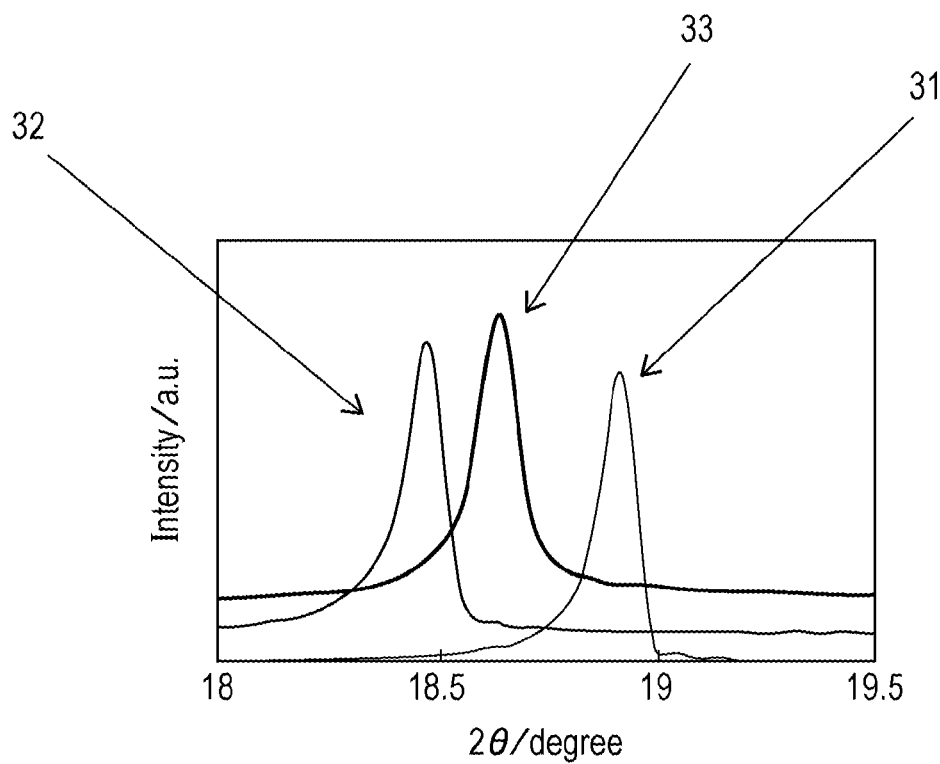
FIG. 8 is a powder X-ray diffraction pattern before and after high-voltage charge in Experiment Example 3.
Figure 9:
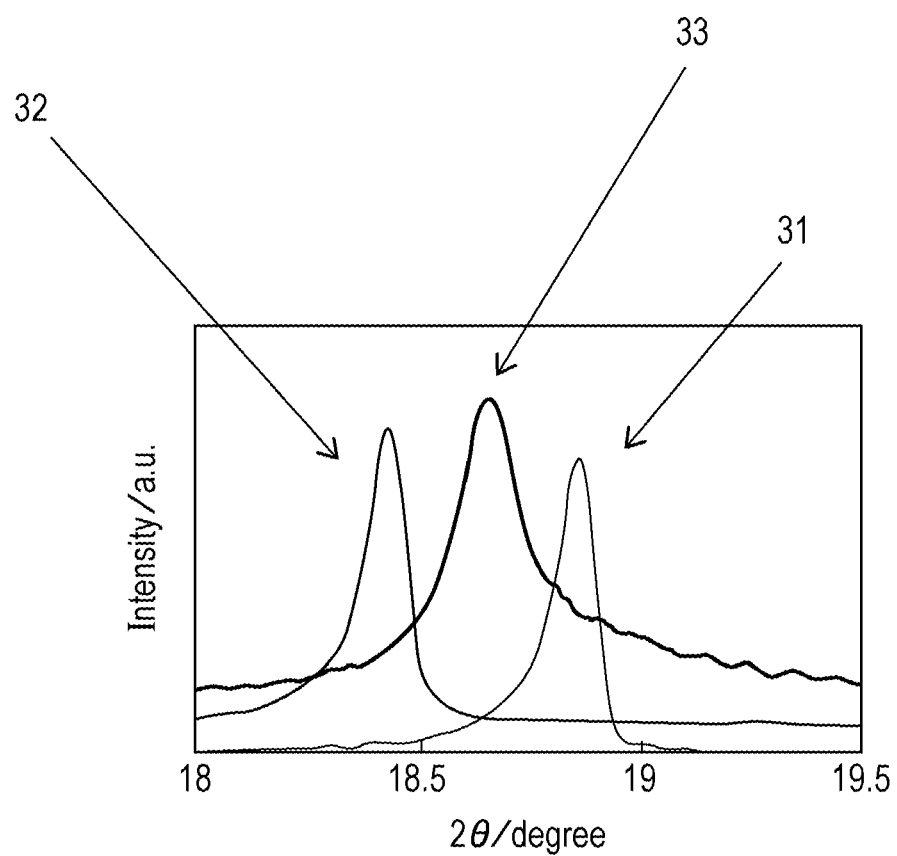
FIG. 9 is a powder X-ray diffraction pattern before and after high-voltage charge in Experiment Example 5.
Figure 10:
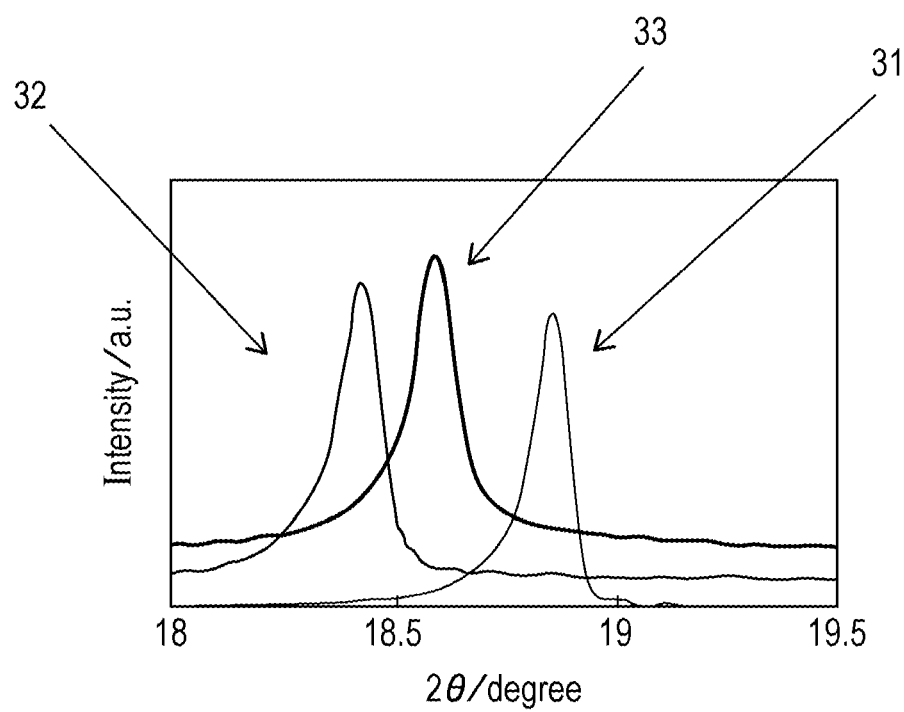
FIG. 10 is a powder X-ray diffraction pattern before and after high-voltage charge in Experiment Example 6.

Results obtained by measuring the positive electrode active material of Experiment Example 1 by powder X-ray diffraction (hereinafter referred to as XRD) are shown in FIG. 5. All peaks could be assigned to the space group R-3m and could be indexed as specified by a three-digit number in FIG. 5. Experiment Examples 2 to 6 yielded similar results.

[Confirmation of Substitution of Magnesium in Lithium Layer]

Next, the diffraction peak intensity ratio 003/104 of the plane indices 003 to the plane indices 104 was calculated. The diffraction intensity is a measure of cation mixing occupied by divalent nickel ions (0.69 Å) with an ionic radius close to that of lithium ions (0.76 Å) in a lithium layer. As the peak intensity ratio is smaller, the degree of cation mixing is greater. It is known that the intensity ratio is 1.37 or less. Divalent magnesium ions (0.72 Å) have an ionic radius close to that of lithium ions and nickel ions. Therefore, whether the cation mixing of magnesium occurred was judged from the intensity ratio.

Measurement results of the diffraction peak intensity ratio 003/104 are shown in Table 3 below. Experiment Example 4 exhibits 1.39 and Experiment Examples 1 to 3, 5, and 6 exhibit 1.37 or less. This confirms that magnesium is present in a lithium layer.

TABLE 3

| | 003/104 |
|---|---|
| Experiment Example 1 | 1.22 |
| Experiment Example 2 | 1.35 |
| Experiment Example 3 | 1.37 |
| Experiment Example 4 | 1.39 |
| Experiment Example 5 | 1.22 |
| Experiment Example 6 | 1.30 |

[Measurement of Phase Transition Suppression]

Next, XRD measurement was performed during charge for the purpose of checking whether a prepared positive electrode active material suppressed the phase transition from an O3 structure to an H1-3 structure in which the crystal structure is significantly disrupted during high-potential charge. The monopolar cell prepared in each of Experiment Examples 1 to 6 was charged at a constant current of 0.15 lt (=15 mA) until the potential of the positive electrode reached 4.50 V and 4.60 V versus lithium. After the batteries were disassembled, the positive electrode active materials prepared in Experiment Examples 1 to 6 were measured by XRD in such a state that positive electrode active materials were not exposed to air for the purpose of preventing the positive electrode active materials from reacting with oxygen or moisture in air.

Figure 11:
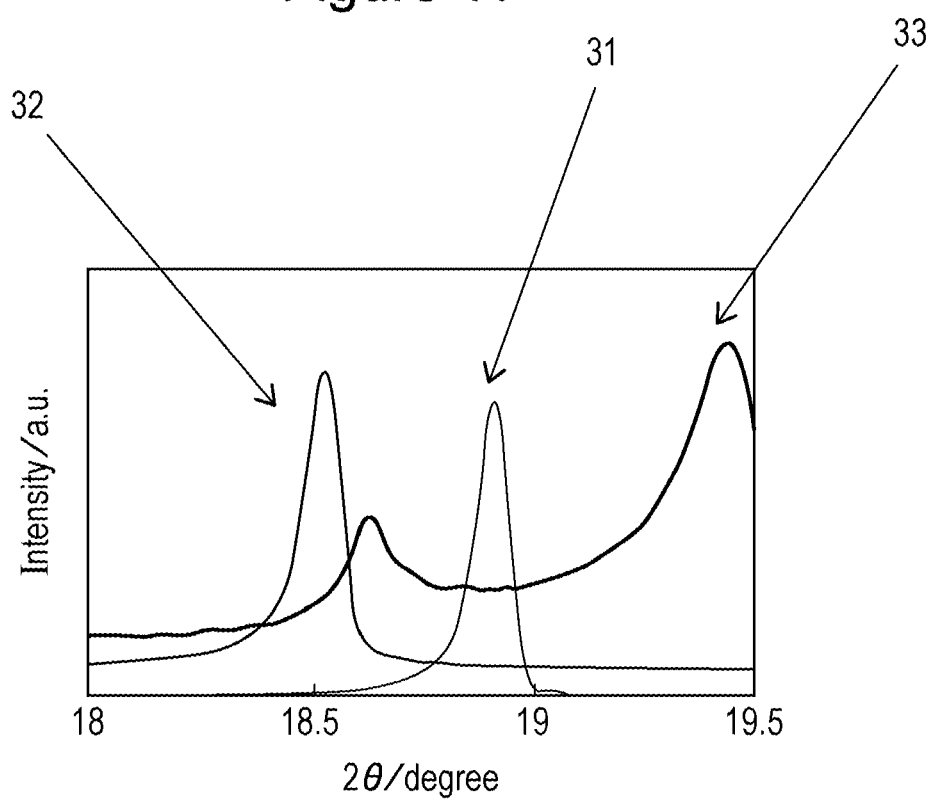
FIG. 11 is a powder X-ray diffraction pattern before and after high-voltage charge in Experiment Example 4.

FIGS. 6 to 11 show XRD of the plane indices 003 after charge. Referring to FIGS. 6 to 11, reference numeral 31 represents an uncharged electrode, reference numeral 32 represents a 4.50 V charged electrode, and reference numeral 33 represents a 4.60 V charged electrode. In general, it is known that after a 003 peak shifts to a lower angle in accordance with charge, the 003 peak begins to shift to a higher angle and shifts to an angle higher than that of the peak before charge when the H1-3 structure appears. In Experiment Example 4, it is clear that a peak of the 4.60 V charged electrode 33 shifts to an angle higher than a peak of the uncharged electrode 31 as shown in FIG. 11. Therefore, in Experiment Example 4, it is clear that the H1-3 structure obviously appears during 4.60 V charge. However, in Experiment Examples 1 to 3, 5, and 6, the 4.60 V charged electrode 33 is present at an angle lower than the uncharged electrode 31 as shown in FIGS. 6 to 10. From this, it is conceivable that in Experiment Examples 1 to 3, 5, and 6, the phase transition from O3 to H1-3 was suppressed by the substitution of magnesium.

INDUSTRIAL APPLICABILITY

A nonaqueous electrolyte secondary battery according to an aspect of the present invention is applicable to, for example, applications, such as mobile phones, notebook personal computers, smartphones, and tablet terminals, requiring particularly high capacity and long life.

REFERENCE SIGNS LIST

10. Monopolar cell
11. Positive electrode
12. Negative electrode
13. Separator
14. Measurement electrode section
15. Reference electrode
16. Reference electrode section
18. Nonaqueous electrolyte solution
20. Nonaqueous electrolyte secondary battery
21. Laminate enclosure
22. Wound electrode assembly 23. Positive electrode current-collecting tab
24. Negative electrode current-collecting tab
31. Uncharged electrode
32. 4.50 V charged electrode
33. 4.60 V charged electrode

The invention claimed is:

1. A nonaqueous electrolyte secondary battery comprising a positive electrode containing a positive electrode active material storing and releasing lithium ions, a negative electrode containing a negative electrode active material storing and releasing lithium ions, and a nonaqueous electrolyte, wherein the positive electrode active material is a cobalt composite oxide which has a layered rock salt structure and which includes a lithium layer containing magnesium, magnesium is present in the lithium layer after charge is performed at a potential of 4.53 V or more versus lithium, and 4.5 mole percent to 10 mole percent of a magnesium-containing compound is present on the negative electrode with respect to magnesium in the positive electrode.

2. The nonaqueous electrolyte secondary battery according to claim 1, wherein the positive electrode active material is represented by the formula $Li_{1-a}Mg_aCo_{1-b}M_bO_2$ (where $0<a\leq0.05$, $0\leq b\leq0.1$, and M is at least one selected from Al, Mg, Mn, Ni, Fe, Ti, Zn, Mo, V, Sr, Sn, Sb, W, Ta, Nb, Ge, Zr, and Ba).

3. The nonaqueous electrolyte secondary battery according to claim 1, wherein the potential of the positive electrode active material for the phase transition to H1-3 structure is 4.53 V or more versus lithium.

4. The nonaqueous electrolyte secondary battery according to claim 1, wherein a rare-earth compound is attached to a portion of the surface of the positive electrode active material.

5. The nonaqueous electrolyte secondary battery according to claim 4, wherein the rare-earth compound includes at least one of erbium hydroxide and erbium oxyhydroxide.

6. The nonaqueous electrolyte secondary battery according to claim 1, wherein the nonaqueous electrolyte contains a fluorinated solvent.

7. The nonaqueous electrolyte secondary battery according to claim 6, wherein the fluorinated solvent includes fluoroethylene carbonate, fluorinated methyl propionate, and fluorinated methyl ethyl carbonate.

* * * * *